United States Patent
Gosse et al.

(10) Patent No.: US 7,603,342 B2
(45) Date of Patent: Oct. 13, 2009

(54) METHOD, DEVICE AND SOFTWARE FOR QUERYING AND PRESENTING SEARCH RESULTS

(75) Inventors: David B. Gosse, Las Vegas, NV (US); Tym D. Feindel, Las Vegas, NV (US); Jungho Kim, Toronto (CA); Justin R. Nutzman, Las Vegas, NV (US); Jason P. Nutzman, Las Vegas, NV (US); Michael T. Winters, Las Vegas, NV (US); Jennifer L. Gosse, Las Vegas, NV (US)

(73) Assignee: Vortaloptics, Inc., Las Vegas, NV (US)

( * ) Notice: Subject to any disclaimer, the term of this patent is extended or adjusted under 35 U.S.C. 154(b) by 169 days.

(21) Appl. No.: 10/778,390

(22) Filed: Feb. 17, 2004

(65) Prior Publication Data

US 2005/0050023 A1    Mar. 3, 2005

Related U.S. Application Data

(63) Continuation-in-part of application No. 10/650,684, filed on Aug. 29, 2003.

(51) Int. Cl.
G06F 17/30 (2006.01)
(52) U.S. Cl. .............................................. 707/3; 707/5
(58) Field of Classification Search ..................... 707/3, 707/104.1, 5
See application file for complete search history.

(56) References Cited

U.S. PATENT DOCUMENTS 5,551,027 A    8/1996    Choy et al.
5,710,915 A    1/1998    McElhiney
5,826,261 A    10/1998   Spencer
5,913,208 A    6/1999    Brown et al.
5,966,710 A    10/1999   Burrows
6,018,733 A    1/2000    Kirsch et al.
6,094,649 A    7/2000    Bowen et al.
6,178,419 B1 * 1/2001    Legh-Smith et al. ........... 707/6

(Continued)

OTHER PUBLICATIONS

Hjaltason, Gisli et al., "Index-Driven Similarity Search in Metric Spaces", ACM Transactions on Database Systems, vol. 28 No. 4, p. 517-580 [online] Dec. 2003 [retrieved on Apr. 30, 2009]. Retrieved from the Internet: <URL: http://portal.acm.org/ft_gateway. cfm?id=958948&type=pdf&coll=ACM&dl=ACM& CFID=32720978&CFTOKEN=26380934>.*

(Continued)

*Primary Examiner*—Jean B Fleurantin
*Assistant Examiner*—Dennis Myint

(57) ABSTRACT

There is disclosed a method, device, and software for presenting search results in a response to an end-user query. Search results are combined from results from a plurality of indexes, each of the search results having an associated key field. Index entries of each of the plurality of indexes are queried using an index-specific search algorithm to obtain a set of matching search results for each index, each matching search result having a quality of match specific to its index. A relative priority is determined for each of the plurality of indexes and the matching search results from the plurality of indexes are combined into a merged list of ordered search results based on the determined priority. A search result from a lower priority index is discarded in favor of any matching search result from a higher priority index.

30 Claims, 10 Drawing Sheets

U.S. PATENT DOCUMENTS

| | | | |
|---|---|---|---|
| 6,327,590 B1 * | 12/2001 | Chidlovskii et al. | 707/5 |
| 6,347,317 B1 | 2/2002 | Singhal | |
| 6,636,854 B2 | 10/2003 | Dutta et al. | |
| 6,728,704 B2 * | 4/2004 | Mao et al. | 707/3 |
| 6,876,997 B1 * | 4/2005 | Rorex et al. | 707/3 |
| 6,947,924 B2 * | 9/2005 | Bates et al. | 707/3 |
| 2002/0194162 A1 | 12/2002 | Rios et al. | |
| 2003/0018624 A1 | 1/2003 | Hsiao et al. | |
| 2004/0010518 A1 * | 1/2004 | Montemer | 707/104.1 |
| 2004/0111412 A1 * | 6/2004 | Broder | 707/7 |
| 2004/0260680 A1 * | 12/2004 | Best et al. | 707/3 |
| 2004/0260695 A1 * | 12/2004 | Brill | 707/5 |

OTHER PUBLICATIONS

Lempel, Ronny et al., "Predictive Caching and Prefetching of Query Results in Search Engines", Proceedings of the 12th international conference on World Wide Web, p. 19-28 [online] May 2003 [retrieved on Apr. 30, 2009]. Retrieved from the Internet: <http://portal.acm.org /ft_gateway.cfm?id=775156&type=pdf&coll=ACM& dl=.*
ACM&CFID=32720978&CFTOKEN=26380934>.*
W. Meng, C. Yu, King-Lupo Liu: "Building Efficient and Effective Metasearch Engines". AMC Computer Surveys, 'Online! vol. 34, No. 1, Mar. 2002, pp. 48-49.

* cited by examiner

| UID | KEYWORD_HASH | KEYWORD_WEIGHT | KEYWORD_LITERAL | HASH_URL |
|---|---|---|---|---|
| UID 1 | 72 | 100 | KW1 | 12 |
| UID 2 | 73 | 70 | KW2 | 12 |
| UID 3 | 74 | 90 | KW3 | 12 |

| HASH_URL | URL | TITLE | DESCRIPTION | STAMP |
|---|---|---|---|---|
| 12 | www.golf1.foo | Golf One | Home Page for Golf One | yy-mm-dd-hh:mm |
| 13 | www.golf2.foo | Golf Two | Home Page for Golf Two | yy-mm-dd-hh:mm |
| 14 | www.golf3.foo | Golf Three | Home Page for Golf Three | yy-mm-dd-hh-mm |

FIG. 2F 270

| CONTRACT_ITEM_ID | RANK | PRICE | START_DATE | END_DATE | GROUP_ID | HASH_URL | HASHED_PHRASE | AD_SITE_ID |
|---|---|---|---|---|---|---|---|---|
| CID1 | 1 | $300 | 01-FEB-04 | 29-FEB-04 | - | 12 | 34 | AD_A |
| CID2 | - | $150 | 01-FEB-04 | 29-FEB-04 | GRP_A | 13 | 34 | AD_B |
| CID3 | - | $150 | 01-FEB-04 | 29-FEB-04 | GRP_A | 14 | 34 | AD_C |
| CID4 | 4 | $100 | 01-FEB-04 | 29-FEB-04 | - | 20 | 34 | AD_J |

FIG. 2G 280

| HASHED_PHRASE | PHRASE |
|---|---|
| 32 | "KW1" |
| 33 | "KW2" |
| 34 | "KW1 KW2" |

FIG. 2H 290

| GROUP_ID | LOWEST_RANK | HIGHEST_RANK | HASHED_PHRASE |
|---|---|---|---|
| GRP_A | 3 | 2 | 34 |

METHOD, DEVICE AND SOFTWARE FOR QUERYING AND PRESENTING SEARCH RESULTS

CROSS REFERENCE TO RELATED PATENT APPLICATIONS

This is a continuation-in-part (CIP) application of a co-pending U.S. patent application entitled: METHOD, DEVICE AND SOFTWARE FOR QUERYING AND PRESENTING SEARCH RESULTS, Ser. No. 10/650,684, filed Aug. 29, 2003, the contents of which are hereby incorporated by reference herein.

FIELD OF THE INVENTION

The present invention relates to search engines and indexes, and more particularly to a method, device and software for querying and presenting search results obtained from a plurality of indexes.

BACKGROUND OF THE INVENTION

The rapid growth of the Internet and the World Wide Web ("web") has resulted in a proliferation of web search engines for indexing some of the billions of web pages available. As is well known, the web is a hypertext information and communication system using a Hyper Text Transfer Protocol ("HTTP"). HTTP allows users to access these web pages which can utilize, among other things, a standard page description language known as Hyper Text Markup Language ("HTML"). HTTP may also be used to access files and other data in many different formats including text files, image files, executable files, data files, and other data sources. Typically, HTTP accesses these web pages, files and data through an addressing schema commonly known as a Uniform Resource Locator ("URL").

By specifying a URL, an end-user is able to access virtually any accessible web resource (text files, image files, executable files, data files, and other data sources) available from a web server connected to the Internet or other network.

However, without knowledge of a URL, an end-user must typically rely on a web search engine that can search a web index or directory to locate URLs for relevant web sites.

While certain search engines ambitiously attempt to broadly index significant portions of the entire web, other search engines may focus on a more specific target, such as a particular "vertical market". A search engine directed to a particular "vertical market" may index selected sites of interest to consumers in that market. Additionally, the search engine may index content that has been prepared for the site hosting the search engine. Finally, the search engine may index other sites. By limiting sites indexed, the search engine is of greater value to consumers in the vertical market of interest. As a result, consumers in the vertical market may be drawn to the site, knowing it may provide focused search results of interest. This appeal may of course be exploited to generate advertising and similar revenue.

As an illustrative example, one such vertical market may be the market for golfing goods and services in a particular geographic region. A particular regional golf web site wanting to attract end-users to the web site may wish to provide end-users with a robust search capability, allowing the end-users to search for not only content of the regional golf web site, but also other golf related sites in the geographic region, and golf sites generally available on the web. Moreover, the regional golf web site may further wish to generate revenue from advertisers, such as regional golf courses and golfing goods manufacturers, by listing the URLs for their web resource in a list of search results. At the same time, the regional golf web site may wish to avoid presenting any search results that may be inappropriate, such as a URL of a web site operated by a main competitor of an advertiser. As will be appreciated, in this illustrative example, search results are obtained from a plurality of search resources.

Previous designs for querying and selectively presenting search results from a plurality of search resources have been limited in their flexibility, particularly where a plurality of indexes corresponding to the search resources have radically different structures and search requirements. A more flexible approach to merging and presenting search results from a plurality of search resources is desirable.

SUMMARY OF THE INVENTION

In accordance with the invention, there is provided a method, device, and software for querying and presenting search results obtained from a plurality of indexes, based on an end-user specified query. In an embodiment, search results are obtained using an index-specific search algorithm for each index. The index-specific search algorithms are modular in the sense that each of the search algorithms may be modified or replaced individually. A merging algorithm with a merging policy is used to merge the search results obtained from the plurality of indexes, according to a relative priority assigned to each index. Any identical search results (i.e. search results having identical associated key fields) identified during merging may by dealt with by the merging policy, for example, by discarding a search result generated from an index having a lower priority.

As an illustrative example, an advertisers' index, a local or private index, and a public index may each be searched separately using index-specific search algorithms. Search results obtained from searching these indexes using these index-specific search algorithms may then be merged and ordered according to priority. For example, the advertisers' index may be assigned a higher relative priority than the private or public indexes, and the private index may be assigned a higher relative priority than the public index.

A search result from one or more of the indexes that supports explicit ranking may be placed in a particular relative placement position or rank in an order of merged search results. During the merging process, the explicit ranking of a URL is maintained such that placement of the URL at or above a relative placement position in a list of search results presented to the end-user is guaranteed. The placement in a particular rank may also be time limited (e.g. by determining whether the time of the end-user query falls within a predetermined time range, such as a date range).

A number of search results may be placed in a range of relative placement positions or ranks defined by a share group. At any given time, membership in the share group may change, in dependence upon a time range (e.g. date range) specified for each index entry in the advertisers' index.

In an aspect of the invention, there is provided a method of presenting search results in a response to an end-user query, the search results being combined from results from a plurality of indexes, each of the search results having an associated key field, the method comprising: (i) querying index entries of each of the plurality of indexes using an index-specific search algorithm to obtain a set of matching search results for each index, each matching search result having a quality of match specific to its index; (ii) determining a relative priority to each of the plurality of indexes; (iii) combining the matching search results from the plurality of indexes into a merged list of ordered search results based on the relative priority of each of the plurality of indexes, in which any search result from a lower priority index for which an associated key field is identical to the associated key field of a matching search result in a higher priority index is discarded, in favor of the matching search result from the higher priority index.

In another aspect of the invention, there is provided a method of presenting search results in a response to an end-user query, the search results being combined from results from at least first and second indexes, each of the search results having an associated key field, the method comprising: (i) querying index entries from a first index using an index-specific search algorithm to obtain matching search results, and identifying at least one relative placement position associated with each matching search result; (ii) querying index entries from a second index using an index-specific search algorithm to obtain matching search results; (iii) combining the matching search results from the first and second indexes into a merged ordered list of search results, in which each matching search result from the first index is placed in the relative placement position, and any search result from the second index for which an associated key field is identical to the associated key field of a matching search result in the first index is discarded, in favor of the matching search result from the first index.

In another aspect of the invention, there is provided a computing device comprising a processor and computer readable memory, the memory storing a plurality of indexes, each comprising a plurality of index entries, the index entries of the plurality of indexes each having an associated key field, search engine software adapting the device to (i) query index entries of each of the plurality of indexes using an index-specific search algorithm to obtain a set of matching search results for each index, each matching search result having a quality of match specific to its index; (ii) determine a relative priority to each of the plurality of indexes; (iii) combine the matching search results from the plurality of indexes into a merged list of ordered search results based on the relative priority of each of the plurality of indexes, in which any search result from a lower priority index for which an associated key field is identical to the associated key field of a matching search result in a higher priority index is discarded, in favor of the matching search result from the higher priority index.

In another aspect of the invention, there is provided a computer readable medium, storing computer executable instructions that when loaded at a computing device comprising a processor and processor readable memory storing a plurality of indexes, each of the indexes comprising a plurality of index entries having an associated key field, adapt the computing device to: (i) query index entries of each of the plurality of indexes using an index-specific search algorithm to obtain a set of matching search results for each index, each matching search result having a quality of match specific to its index; (ii) determine a relative priority to each of the plurality of indexes; (iii) combine the matching search results from the plurality of indexes into a merged list of ordered search results based on the relative priority of each of the plurality of indexes, in which any search result from a lower priority index for which an associated key field is identical to the associated key field of a matching search result in a higher priority index is discarded, in favor of the matching search result from the higher priority index.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate exemplary embodiments of the invention:

FIG. 2F is an illustrative example of a "contract item" database table corresponding to the database schema of FIG. 2E;

FIG. 2G is an illustrative example of a "key phrase" database table corresponding to the database schema of FIG. 2E;

FIG. 2H is an illustrative example of a "share group" database table corresponding to the database schema of FIG. 2E;

DETAILED DESCRIPTION

Figure 1A:
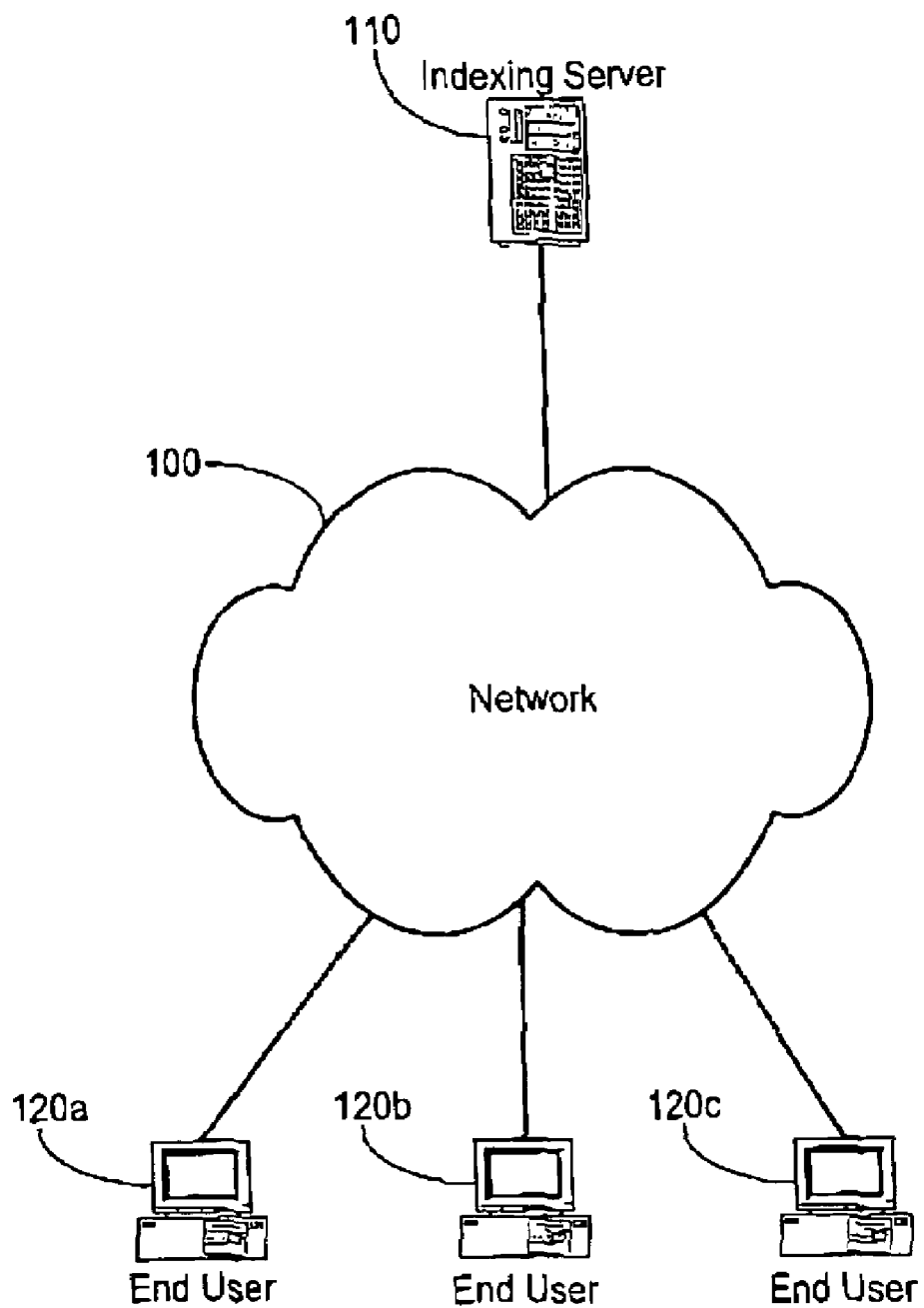
FIG. 1A is a simplified schematic diagram of an exemplary data communications network interconnected with an indexing server exemplary of an embodiment of the present invention, in communication with a plurality of computing devices.

FIG. 1A illustrates an exemplary data communications network 100, interconnected with an indexing server 110 exemplary of an embodiment of the present invention, in communication with a plurality of computing devices 120a, 120b and 120c (individually and collectively devices 120).

Computing devices 120 and indexing server 110 are all conventional computing devices, each including a processor and computer readable memory storing an operating system and software applications and components for execution.

Data communications network 100 may, for example, be a conventional local area network that adheres to suitable network protocol such as the Ethernet, token ring or similar protocols. Alternatively, the network protocol may be compliant with higher level protocols such as the Internet protocol (IP), Appletalk, or IPX protocols. Similarly, network 100 may be a wide area network, or the public internet.

Client computing devices 120 are network aware computing devices, providing an end-user interface that allows an end-user to view information stored at indexing server 110. Computing devices 120 may for example, be conventional Windows based computing devices storing and executing an HTML compliant browser, such as a Microsoft Windows Explorer, Netscape Navigator or similar browser.

As will become apparent, indexing server 110 stores web indexing information, and may store software allowing devices 120 to search the stored indexing information.

Figure 1B:
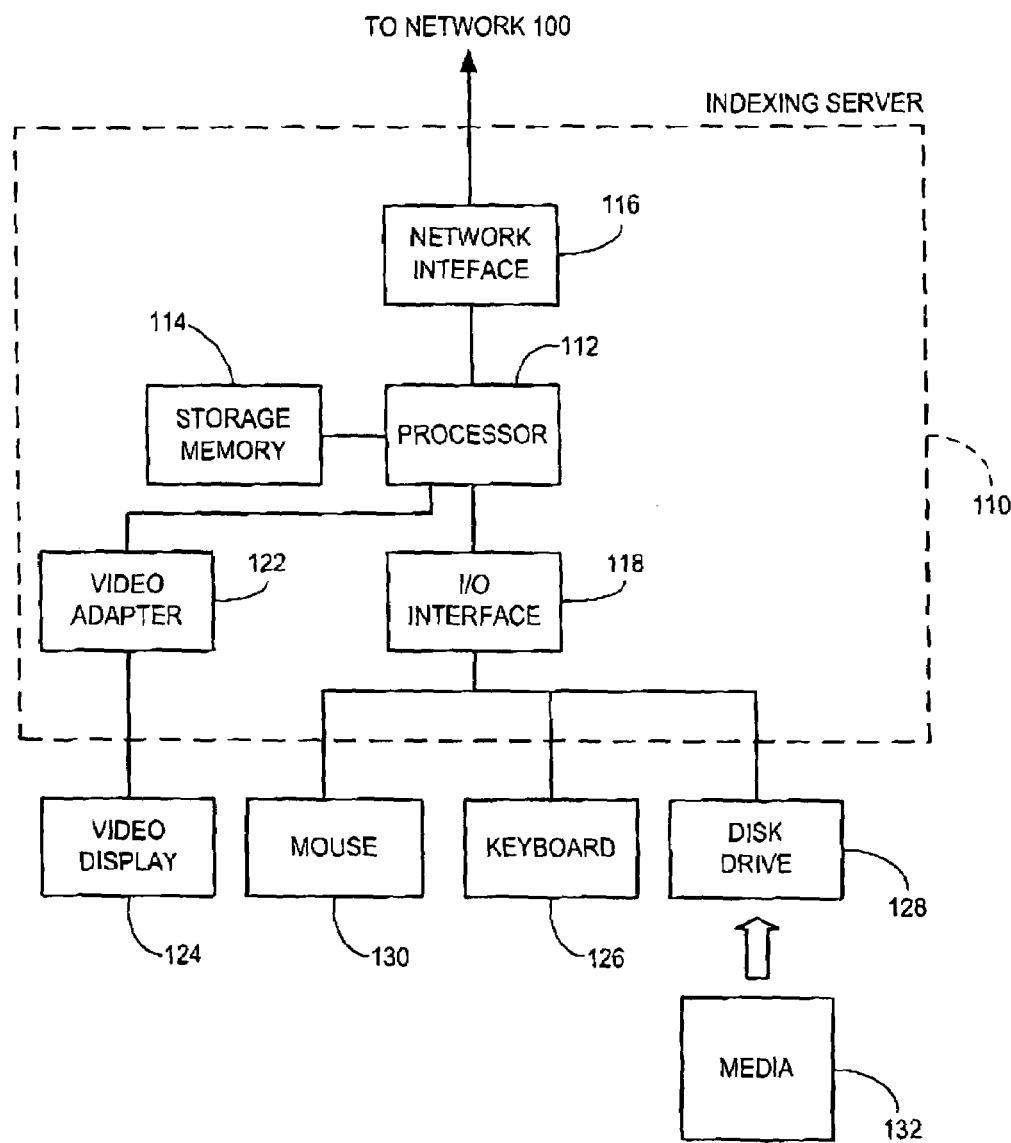
FIG. 1B is a simplified schematic block diagram of a hardware architecture of the indexing server of FIG. 1A.

A simplified preferred hardware architecture of an example indexing server 110 is schematically illustrated in FIG. 1B. In the illustrated embodiment, indexing server 110 is a conventional network capable server. Indexing server 110 could, for example, be an Intel x86 based computer acting as a Microsoft Windows NT, Apple, or Unix based server, workstation, personal computer or the like. Example indexing server 110 includes a processor 112, in communication with computer storage memory 114; network interface 116; input output interface 118; and video adapter 122. As well, indexing server 110 may optionally include a display 124 interconnected with adapter 122; input/output devices, such as a keyboard 126, disk drive 128, and a mouse 130 or the like. Processor 112 is typically a conventional central processing unit, and may for example be a microprocessor in the INTEL x86 family. Of course, processor 112 could be any other suitable processor known to those skilled in the art. Computer storage memory 114 includes a suitable combination of random access memory, read-only-memory, and disk storage memory used by processor 112 to store and execute software programs adapting processor 112 to function in manners exemplary of the present invention. Disk drive 128 is capable of reading and writing data to or from a computer readable medium 132 used to store software and data, exemplary of embodiments of the present invention, to be loaded into memory 114. Computer readable medium 132 may be a CD-ROM, diskette, tape, ROM-Cartridge or the like. Network interface 126 is any interface suitable to physically link server 110 to network 100. Interface 126 may, for example, be an Ethernet, ATM, ISDN interface or modem that may be used to pass data from and to network 100 or another suitable communications network.

The hardware architectures of computing devices 120 are materially similar to that of indexing server 110, and will therefore not be further detailed.

Figure 2A:
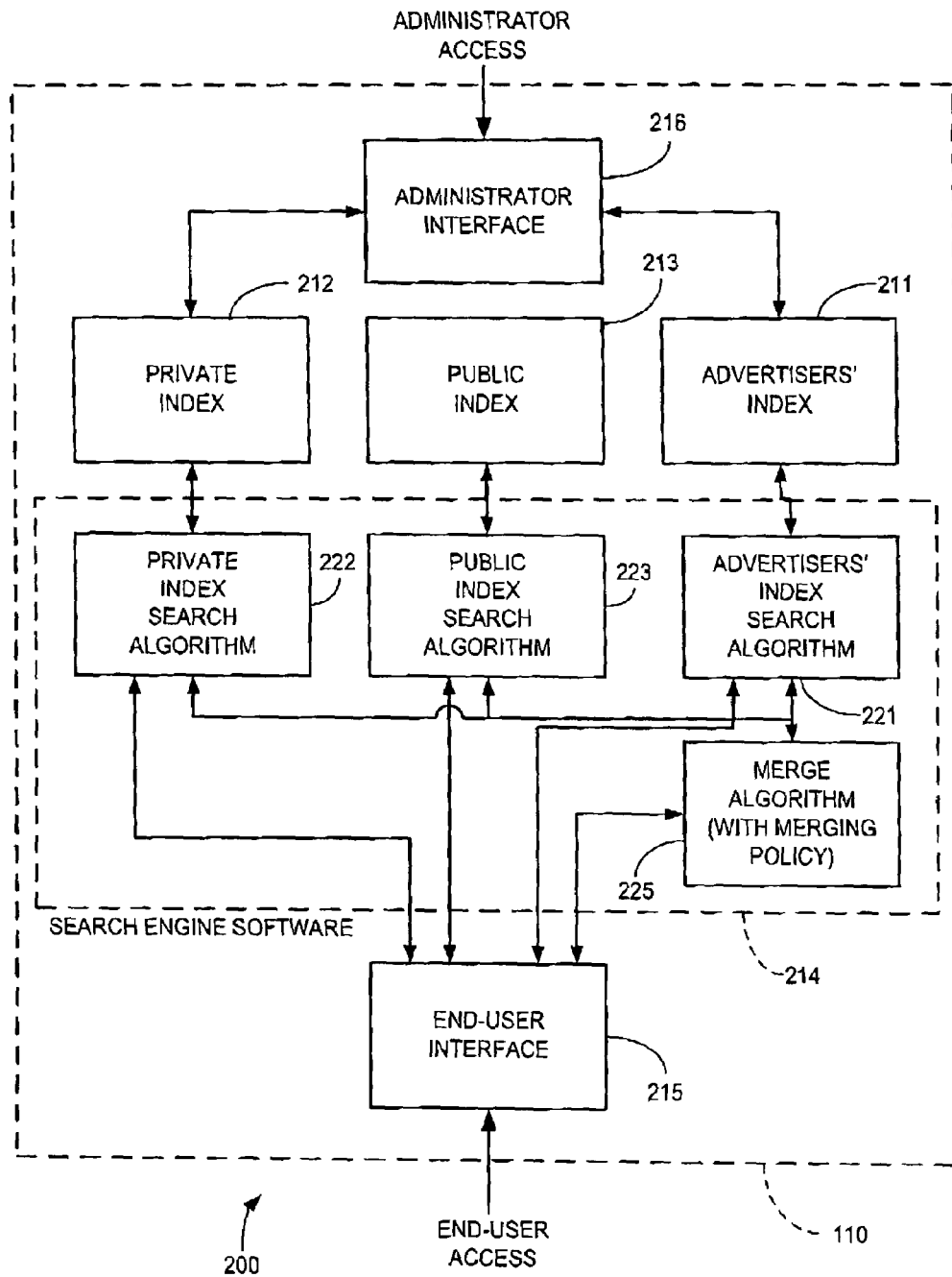
FIG. 2A is a logical block diagram of illustrative software and data components at the indexing server of FIGS. 1A and 1B.

FIG. 2A is a logical block diagram of illustrative software and data components at server 110. As shown, the server 110 may host a plurality of indexes, each index having an index-specific search algorithm associated therewith. The server 110 may also host a merging algorithm with a merging policy that may be used to merge search results obtained from each of the plurality of indexes, for example, according to a relative priority assigned to each index.

As a specific example, consider a web site for a particular vertical market, such as the regional golf web site introduced earlier. Such a web site may have a server 110 hosting a plurality of indexes, including an advertisers' index 211, a private index 212 and a public index 213.

The advertisers' index 211 may contain entries for advertising contracts. Each advertising contract may relate to a particular advertiser wishing to place an "advertisement" that comprises the advertiser's URL in a particular relative placement position or rank in an ordered list of search results. The contract may specify a specific key phrase that must be matched, and a date range for which the contract is effective. For example, the advertisers' index 211 may contain index entries for various regional golf courses and golfing goods manufacturers that wish to guarantee that their web site URL appear in the results of a query conducted on the regional golf web site by an end-user, during a particular advertising period defined by a date range (e.g. a start date and an end date).

The private index 212 may comprise entries for various URLs that the regional golf web site wishes to make available for searching by an end-user. For example, index entries in the private index 212 may contain URLs for content on the regional golf web site, URLs for other regional golf web sites, and possibly entries for one or more URLs that are also found in the advertisers' index 211.

The public index 213 may comprise URLs indexed by a third party (e.g. the open directory database DMOZ—Open Directory Project available at the URL "http://www.dmoz.org")

The indexing server 110 may further host search engine software 214, end-user interface 215, and an administrator interface 216.

As will become apparent, an end-user at devices 120 may access search engine software 214 through network 100, by communicating with end-user interface 215. The search engine software 214 may itself be embodied as one or more software modules stored in memory and executable on a processor in the indexing server 110. End-user interface 215 may, for example, provide a search box and accept search requests provided as "name=value" pairs embedded within an HTTP GET/POST request.

A web site administrator, for example, acting on behalf of the illustrative regional golf web site, may access advertisers' index 211 and private index 212, by way of an administrator interface 216. The administrator may modify advertiser records in index 211 and records in private index 212, but the administrator cannot modify records in public index 213.

Search engine software 214 may access the search algorithms 221, 222 and 223, each search algorithm being specific to one of indexes 211, 212 and 213, and defining how a search is to be performed on the associated index 211, 212, 213. Thus, each index 211, 212, 213 is searched by its own index-specific search algorithm 221, 222, 223. These search algorithms 221, 222, 223 are modular in the sense that each of the search algorithms 211, 222, 223 may be modified or replaced individually. This modularity provides great flexibility in terms of obtaining desired search results from a plurality of indexes 211, 212, 213, which may be radically different in structure. In the context of a search engine for a vertical market web site, this flexibility allows a web site administrator to merge and present search results from a plurality of disparate indexes which are relevant to the vertical market.

As will be detailed further below, a merging algorithm 225 may be used to merge the search results obtained from the indexes 211, 212, 213, using index-specific search algorithms 221, 222 and 223, respectively.

It will be understood that the term "administrator" as used in the present description may refer to any individual given the task of administering one or more of the indexes 211, 212, 213, the search engine software 214, associated search algorithms 221, 222, 223, or the merge algorithm 225.

Figures 2B, 2C, 2D:
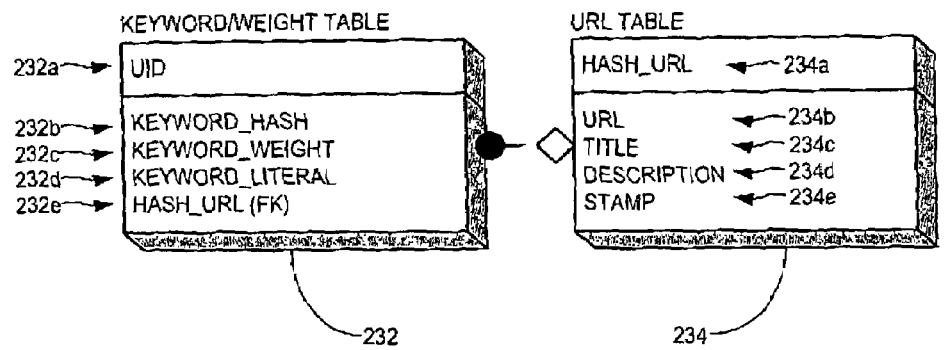
FIG. 2B is a schematic block diagram of an exemplary database schema for the illustrative private index in FIG. 2A.
FIG. 2C is an illustrative example of a keyword/weight database table corresponding to the database schema of FIG. 2B.
FIG. 2D is an illustrative example of a URL database table corresponding to the database schema of FIG. 2B.

In the disclosed embodiments, indexes 211, 212 and 213 are stored as one or more relational databases. FIG. 2B is a schematic block diagram of an exemplary database schema 230 for private index 212 of FIG. 2A. In index 212, web page URLs are indexed with associated one or more weighted key words. Multiple records of table 240 define the key word(s) (KEYWORD_HASH) and weight(s) (KEYWORD_WEIGHT) associated with a web page URL (HASH_URL). The UID in the KEYWORD/WEIGHT TABLE (232) is a physical primary key which serves to uniquely identify each record. As shown by schema 230, database storing index 212 may include a keyword/weight table 232 and a corresponding URL table 234.

FIG. 2C illustrates a keyword/weight database table 240 corresponding to schema 230 (FIG. 2B). More specifically, table 240 includes a plurality of records 240a-240c, each containing a plurality of fields 232a-232e for a particular search entity, such as a local golf course web site having a particular URL. Using arbitrarily chosen values for illustration, records 240a-240c contain, respectively: keyword hash values "72", "73", "74"; weightings 100, 70, 90; literal keywords "KW1", "KW2", "KW3"; and hash URL values "12", "12", "12". Thus, in this particular example, an index entry for the golf course URL having a hash value "12" includes three keywords "KW1", "KW2", "KW3" having relative weightings of 100, 70 and 90.

FIG. 2D is an illustrative example of a database table 250 of index 212 corresponding to URL table 234 of FIG. 2B. More specifically, database table 250 includes a plurality of records 250a-250c each having a plurality of fields 234a-234e. Each record of table 250 provides detailed information about an indexed URL. Using arbitrarily chosen values for illustration, the records 250a-250c of database 250 contain, respectively: hash URLs "12", "13", "14"; corresponding to various URL addresses, such as www.golf1.foo, www.golf2.foo, www.golf3.foo; titles "Golf One", "Golf Two", "Golf Three"; descriptions "Home page for Golf One", "Home page for Golf Two", "Home page for Golf Three"; and corresponding date/time stamps. While the URL addresses in this simplified example relate to home pages for three golf related web sites, generally, it will be understood that these URLs may locate virtually any type of web resource, which may be similarly indexed in table 250. Thus, more generically, these URL addresses or values are simply referenced as URL_A, URL_B, URL_C, etc. in the example discussed in FIG. 4, below.

Figure 2E:
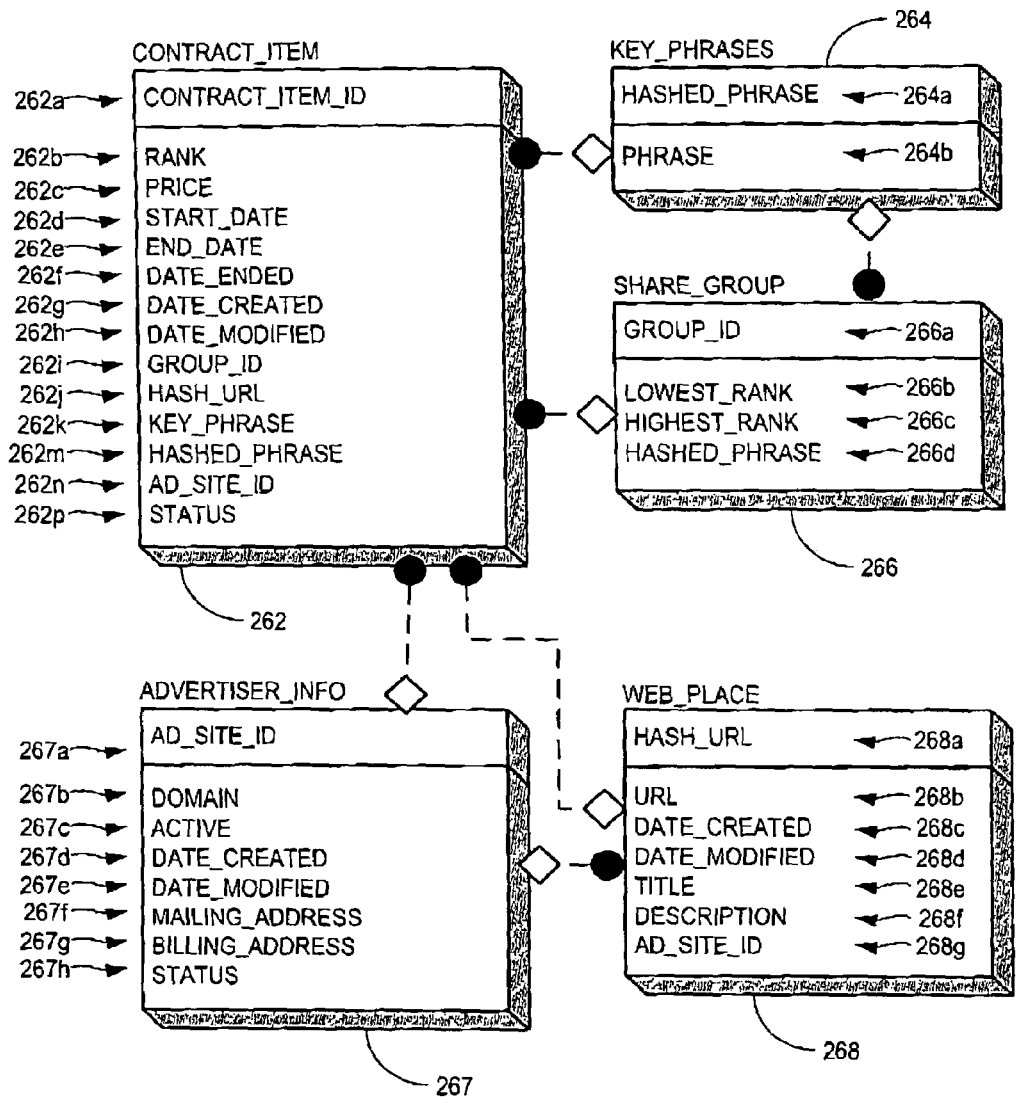
FIG. 2E is a schematic block diagram of an exemplary database schema for the illustrative advertisers' index in FIG. 2A.

FIG. 2E is a schematic block diagram of an exemplary database schema 260 for advertisers' index 211 of FIG. 2A. More specifically, the database schema 260 comprises, in this illustrative example, a "contract item" table 262, a "key phrase" table 264, a "share group" table 266, an "advertiser info" table 267, and a "web place" table 268. (Web place table 268 corresponds in function to URL table 234 of FIG. 2B, and may in fact reference some of the same URLs, using the same URL hash values as shown by illustration in FIG. 2C and FIG. 2D.) It will be understood that the database schema 260 is merely illustrative and that the database schema may exist in many other forms.

FIG. 2F is an illustrative example of a populated database table 270 corresponding to the "contract item" table 262 of FIG. 2E. For the purposes of illustration, only a selection of attributes 262a-262p from "contract item" table 262 are shown in database table 270: a contract ID 262a (CONTRACT_ITEM_ID), a rank 262b in an order of search results (RANK), a price 262c for that rank (PRICE), a start date 262d (START_DATE), an end date 262e (END_DATE), various other dates that may be relevant to the contract item (DATE_ENDED, DATE_CREATED, DATE_MODIFIED), a "share group" 262i (GROUP_ID), a URL hash 262j (HASH_URL), a key phrase hash value 262m (HASHED_PHRASE) for a key phrase, and corresponding advertiser information 262n (AD_SITE_ID). In this illustrative example, the hash URL 262j may be used, for example, to refer to a URL value in a manner substantially analogous to the hash URL 232e/234a described above in FIG. 2C and FIG. 2D. It will be understood that the URL used for the advertising contracts may refer to virtually any web resource accessible via its URL. In the present illustrative example, advertisers ID 262n identifies the advertiser (e.g. by cross reference to table 267 of FIG. 2E), and is not related to the hash URL 262j which identifies the URL for the "advertisement".

Thus, for example, a regional golf course may set up a contract with the administrator for the regional golf web site and be entered into the advertisers' index 211 by supplying necessary information to complete all relevant fields (e.g. 262a-262n) in database table 270. The advertising contract may specify, for example, that the golf course's URL value is to appear in rank 1 of a search conducted by an end-user on the regional golf web site using the key phrase "GOLF", during a predetermined time range (e.g. as specified by start date 262d and end date 262e).

In the context of the present illustration, the "key phrase" (corresponding to the key phrase hash value 262m) comprises a searchable string or unit corresponding to the query entered by an end-user. A particular key phrase may be stored with each index entry in the advertisers' index 211 so that an exact match to that key phrase is required in order for an advertisement to be displayed in the specified rank. Use of the key phrase permits an advertiser to contract for a specific rank in an order of search results.

The start date 262d and end date 262e define a time range during which an advertising contract is valid. Thus, a query expression used to query advertisers' index 211 should contain not only a "key phrase" that must be matched, but also the "current date" of a query, which must fall within the time limit specified by the start date 262d and end date 262e. This permits an advertiser to contract for a specific rank or relative placement position in an order of search results during a specified advertising period.

For example, during a specified advertising period, the regional golf course may reserve rank 1 in the ordered list of search results for the key phrase "GOLF", while a golf ball manufacturer reserves rank 1 in the ordered list of search results for the key phrase "GOLF BALL". In this case, if an end-user enters the query "GOLF", and the advertising contracts for both advertisements are valid on the particular day when the query is made, the advertisement for the regional golf course would appear in rank 1 as this query matches the key phrase exactly. The advertisement for the golf ball manufacturer will not be displayed. However, if the end-user enters the query "GOLF BALL", the advertisement for the golf ball manufacturer would appear in rank 1, and the advertisement for the regional golf course will not be displayed.

Alternatively, an advertiser, such as a leading golf goods manufacturer, may wish to reserve for a certain period of time a rank for a number of different key phrases (e.g. "GOLF BALLS", "GOLF BAGS", "GOLF CLUBS", "GOLF SHOES", etc.) so that the advertiser's URL appears in that rank for any one of the key phrases resulting from an end-user query.

In the present illustrative embodiment, a rule is applied whereby no two advertisements associated with a given key phrase may be assigned the same rank at any given moment in time. For example, if Advertiser A has purchased an advertisement contract for the key phrase "GOLF BALLS" from Jan. 30, 2004-Feb. 15, 2004, for rank 1, Advertiser B can purchase an advertisement contract for the key phrase "GOLF BALLS" from Feb. 16, 2004-Mar. 1, 2004, for rank 1. However, Advertiser B cannot purchase an advertisement contract for the key phrase "GOLF BALLS" from Feb. 1, 2004-Mar. 1, 2004, for rank 1 as the date range overlaps that of an existing advertisement contract.

FIG. 2G is an illustrative example of a "key phrase" database table 280 corresponding to the schema of FIG. 2E and which may store one or more such key phrases. As shown, a key phrase hashed value 264a (HASHED_PHRASE) corresponds to the key phrase hashed value 262m in the contract item table 270.

FIG. 2H is an illustrative example of a "share group" database table 290 corresponding to the database schema of FIG. 2E. As the name suggests, a share group may be formed to deal with two or more matched search results as a group. For example, in the present illustrative example, a share group may be formed when it is desirable to place a number of advertisements matched to a key phrase within a range of ranks defined for the share group. This may be advantageous, for example, where an advertiser A wishes to display a group of related advertisements within a particular range of ranks in an ordered list of search results.

In the disclosed embodiment, the rank 262b (RANK) in database table 270 only applies if the share group 262i (GROUP_ID) field for a given contract is undefined. If the share group 262i field is defined, then the actual rank for the contract is determined at query time. If the share group 262i is not defined, the rank 262b determines placement.

For example, if there exists a share group Y with a lowest rank 266b of 10 and highest rank 266c of 5 for a given key phrase (and where 1 is the highest possible rank in the ordered list), a new contract item that is not to be placed in share group Y cannot be given any rank within the range 5-10 at the time the contract is created. Rather, in order to appear in one of ranks 5-10, the contract item must be placed in the share group Y. At query time, in the disclosed embodiment, the advertisers' index search algorithm 221 will randomly rank each contract item in share group Y. Hence, for contracts in a share group, the rank 262b field is not used.

In the disclosed embodiment, a plurality of advertisers may also be members of a share group sharing a range of ranks. For example, share group Z may define the range 11-15 for the key phrase "GOLF BALLS". The following contracts may be members of share group Z: contract A valid from Jan. 1, 2004-Feb. 1, 2004; contract B valid from Feb. 1, 2004-Mar. 1, 2004; and contract C valid from Jan. 15, 2004-Feb. 15, 2004. If a query is executed on Feb. 1, 2004 using the key phrase "GOLF BALLS", all three contracts A, B and C would match, and the associated advertisements would be ranked somewhere within the range 11-15. On the other hand, if a query is executed on Jan. 15, 2004, only contracts A and C would match, and the associated advertisements would be ranked within the range 11-15. Note that the time range is associated with each contract, and not with the share group. Thus, on any given day, there may be a different set of contracts for a share group returned by a query.

As shown by way of illustration, the share group database table 264 may have a number of defining attributes 266b-266d, including an identification 266a (GROUP_ID), a guaranteed lowest rank 266b (LOWEST_RANK), a default highest rank 266c (HIGHEST_RANK), and a hashed phrase 266d (HASHED_PHRASE) corresponding to the hashed phrase 264a of key phrase table 264 and hashed phrase 262m of contract item table 262. In this illustrative example, for a share group A, the lowest rank 266b has the value of 3 and the minimum highest rank 266c has the value of 2 (here, by way of illustration, the convention used is that 3 is a "lower" rank than 2), indicating that an advertisement in the share group is guaranteed placement in rank 2 or 3.

The highest rank 266c is said to be a "minimum" highest rank as it is possible that the highest rank of share group A many in fact be displayed to the end-user as an even higher rank. For example, consider a situation where there is no advertisement in rank 1 resulting from an end-user query, while rank 2 and rank 3 are occupied by advertisements associated with share group A. In this case, while the guaranteed lowest rank of share group A is 3 and the minimum highest rank of share group A is 2, the actual rank of share group A when displayed to the end user will be 1 and 2 since rank 1 is not occupied. In this context, it will be appreciated that placement in a desired placement position is relative, and that the actual placement position when displayed to the end-user may vary depending on whether or not all placement positions are occupied.

It will be appreciated that, for a given share group, any suitable range of ranks may be defined by the guaranteed lowest rank 266b and the minimum highest rank 266c. In this case, the share group defines a contiguous range of ranks such that any advertisements placed in the share group are displayed in a contiguous order to an end-user.

While specific examples are not shown, the advertiser information table 267 of FIG, 2E may contain various attributes 267a-267h including address, billing and status information for a particular advertiser, and the "web place" table 268 of FIG. 2E may contain various attributes 268a-268g defining the advertiser's URL which comprises the "advertisement". It will be understood that these attributes 268a-268g are merely illustrative.

Figure 3A:
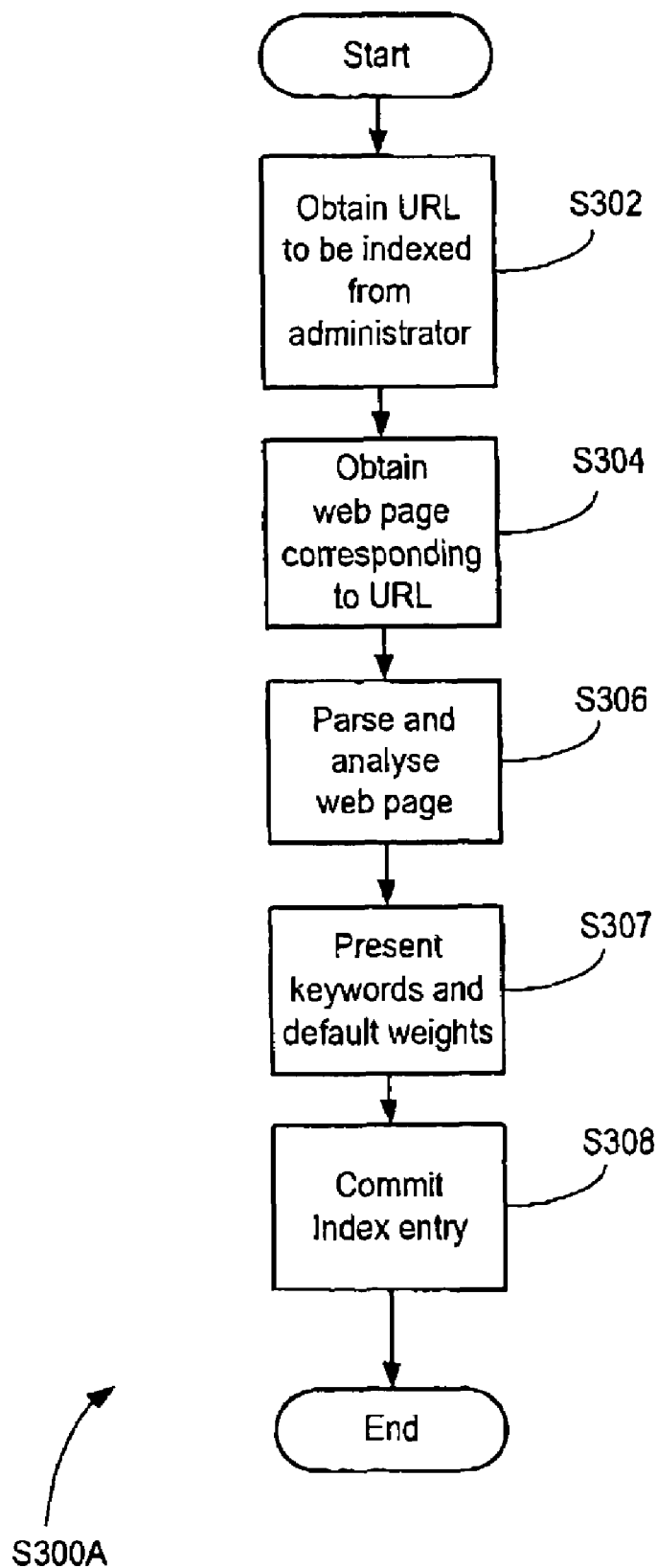
FIG. 3A is a schematic flow chart of exemplary steps for associating keywords and assigning weightings to URLs in order to create records in the databases of FIGS. 2C and 2D.

FIG. 3A is a flow chart showing exemplary steps S300A for associating keywords and assigning weightings to URLs in order to create records in table 240 and 250 of private index 212 (FIG. 2A). It will be appreciated by those skilled in the art that steps S300A may be embodied in computer software in exemplary embodiments of the present invention, including readable code written in a suitable computer language. Thus, steps 300A may be performed by server 200 under control of software exemplary of embodiments of the present invention.

As illustrated, a URL to be indexed is obtained from an administrator in step S302. In step S304 the URL is obtained. In step S306, the contents of the URL are parsed and analyzed in order to identify possible keywords that might be used to index the web resource. For example, keywords may be identified by their frequency in a web page, in meta-tags or in any other way understood by those of ordinary skill. In an embodiment, up to 20 of the most relevant keywords (as identified in step S306) are each assigned a numerical weight, corresponding to their perceived relevance. The list of keywords and weights is presented by way of an administrator interface (e.g. administrator interface 216 of FIG. 2A) to an administrator in step S307. Optionally, the administrator may alter the presented keywords and/or weightings by way of the administrator interface 216, for reasons that will become apparent. Once edited, an administrator may commit the index entry, including the list of keywords and URL, for storage as records in table 240 and table 250 of index 212, in step S308. Each keyword is used to populate one row of table 240.

Repeated use of steps S300A allow an administrator to build a collection of indexed URLs, each containing an index entry within private index 212. In the context of the illustrative regional golf web site example, the collection of indexed sites may comprise URLs for a list of regional golf courses. As will become apparent, by assigning desired keywords and weighting to indexed URLs, the administrator can effectively "shape" or organize obtained search results for any search performed by search algorithm 222.

An administrator may assemble records in the advertisers' index 211 in an analogous manner, by obtaining the necessary details for each advertising contract to be placed in the advertisers' index 211. In the disclosed embodiment, such information includes at least the advertiser's web page URL, a key phrase associated with that URL, a date range during which the advertisement is to run, and either an explicit rank or placement in a share group. Other information may also be provided as part of each record.

By contrast, public index 213 contains index information not assembled by an administrator, and may instead be made available by a third party index provider, such as the DMOZ database. In the disclosed embodiment, index 213 is stored in a database having much the same format as the database storing index 212. Of course, index 213 may alternatively have a data structure entirely different from index 212, as may advertisers' index 211.

In manners exemplary of embodiments of the present invention, an administrator may index a URL already indexed within public index 213, in private index 212. Furthermore, a URL indexed within public index 213 or private index 212 may also be indexed in advertisers' index 211 as part of a particular advertising contract for an advertiser.

As will now be explained, having index-specific search algorithms 221, 222, 223 for a plurality of indexes 211, 212, 213, and further having a merging algorithm 225 with a merging policy to merge the search results obtained by each index-specific search algorithm algorithms 221, 222, 223, provides a web site administrator with a highly flexible approach to querying and presenting search results. This flexibility may include modifying any one of the index specific search algorithms 221, 222, 223, or the merging algorithm 225 to modify the shaping or organizing of search results presented to an end-user, virtually in real time. In comparison to traditional search engines that may have cycle times of days, weeks or longer, it will be appreciated that this type of flexibility is a highly desirable characteristic of a search engine for a vertical market.

Figure 3B:
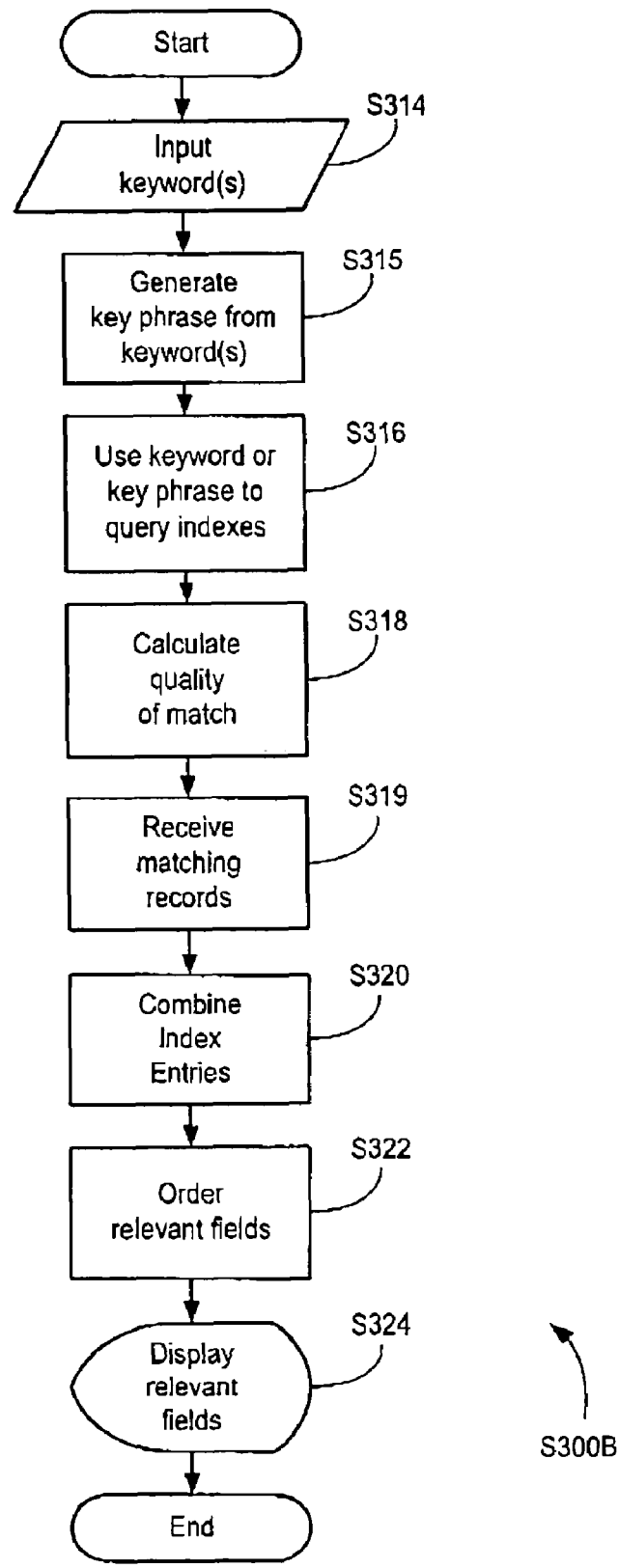
FIG. 3B is a schematic flow chart of exemplary steps performed by the indexing server to query a plurality of indexes in response to a query request.

By way of example, FIG. 3B shows exemplary steps S300B performed by indexing server 110 to query advertisers' index 211, private index 212 and public index 213, in response to a query request including one or more keywords input by an end-user visiting the regional golf web site. It will be appreciated by those skilled in the art that steps S300B may be embodied in computer software in exemplary of embodiments of the present invention, including readable code written in a suitable computer language.

As illustrated, a query input at indexing server 110 by an end-user is received in step S314. In step S315, the end-user query input in step S314 is used to generate a corresponding key phrase (e.g. key phrase 262k of contract items table 262) or one or more key words (e.g. key words 232d of table 240), as the case may be, that may be used to search an index 211, 212, 213.

In step S316, the keyword or key phrase generated in step S315 is used by the index-specific search algorithms 221, 222 and 223 to query the indexes 211, 212 and 213, respectively. Each index-specific search algorithm 221, 222, 223 uses appropriate search information generated from the end-user query and to order or place the results. For example, index-specific search algorithm 221, may use the key phrase and the "current date" of the query to locate matching entries in the advertisers' index 211, and order the search results according to specified rank or share group, as previously discussed. Index-specific search algorithm 222 may use key words generated from the end-user query to search for matching entries in the private index 212, and order the search results according to key word weightings (as explained in further detail with reference to FIG. 4, below). Similarly, index-specific search algorithm 223 may use key words generated from the end-user query to search for matching entries in the public index 213, and order the search results according to another set of key word weightings (as explained in further detail, again with reference to FIG. 4, below).

At step S318, a quality of match indicator is calculated for each matching record. In the disclosed embodiment, the quality of match indicator for index 211 is calculated by determining whether a key phrase matches the query exactly, and whether the "current date" falls within a defined date range. In this respect, the quality of match for a matching index entry in the advertisers' index 211 may be said to be 100%. Also, in the disclosed embodiment, the quality of match indicator for each of indexes 212 and 213 is calculated by summing the weighting (e.g. as contained in field 232c of table 240) of each keyword matching the end-user query.

Conveniently, index-specific search algorithms 221, 222 and 223 (FIG. 2A) may individually calculate a different quality of match, potentially based on entirely different criteria, for each search result obtained from advertisers' index 211, private index 212, and public index 213.

In the context of the example of the regional golf web site, this provides an administrator for the web site great flexibility in querying and presenting search results, for a given end-user query. For example, the administrator may search private index 212 using a set of weight assignable key words, public index 213 using a set of pre-assigned key word weightings, and advertisers' index 211 using exact matches for key phrases and a particular date range.

At step S319 the search results obtained in step S316 and having a quality of match calculated at step S318 are received by a merging algorithm, such as merging algorithm 225 of FIG. 2A.

Matching search results from advertisers' index 211, private index 212, and public index 213 may then be merged in step S320. The results may be combined in any number of ways according to a pre-defined merging policy executed by the merging algorithm 225. For example, index entries from private and public indexes 212, 213 may be collectively ordered based on the quality of match calculated for each index entry. Index entries with higher quality of matches may be presented in advance of index entries having lower quality of matches. Alternatively, all matching entries from private index 212 may be presented in advance of entries from public index 213. Furthermore, matching search results from the advertisers' index 211 may be given the highest priority such that an advertiser's web page URL may be placed in a particular rank, or in a defined range of ranks, as discussed above.

In the event a site is indexed in more than one of indexes 211, 212 and 213, an index entry from a higher priority index may pre-empt an index entry from a lower priority index. That is, instead of including both index entries from private index 212 and public index 213, for example, only the index entry from private index 212 is possibly presented.

In the context of the regional golf web site example, the web site administrator may prioritize the indexes 211, 212, 213 so that a search result from the advertisers' index 211 pre-empts any identical URL listing in the private index 212 or public index 213, and in turn a search result from the private index 212 pre-empts any identical URL listing in the public index 213.

Using the merging strategy of the merging algorithm 225, relevant fields in the records combined at step S320 are ordered at step S322 and relevant fields are displayed to the end-user in a merged, ordered list at step S324. As noted above, URLs having a specified rank for merging at step S322 may in fact have a higher rank when displayed to the end-user at step S324.

In the disclosed embodiment, the URL field 234b of FIG. 2B or the URL field 268a of FIG. 2E may be displayed to the end-user at step S324. Additional fields such as the title fields 234c, 268e the description fields 234d, 268f and the date stamp/modified field 234e, 268d may also be displayed. Steps S300B then end.

Figure 4:
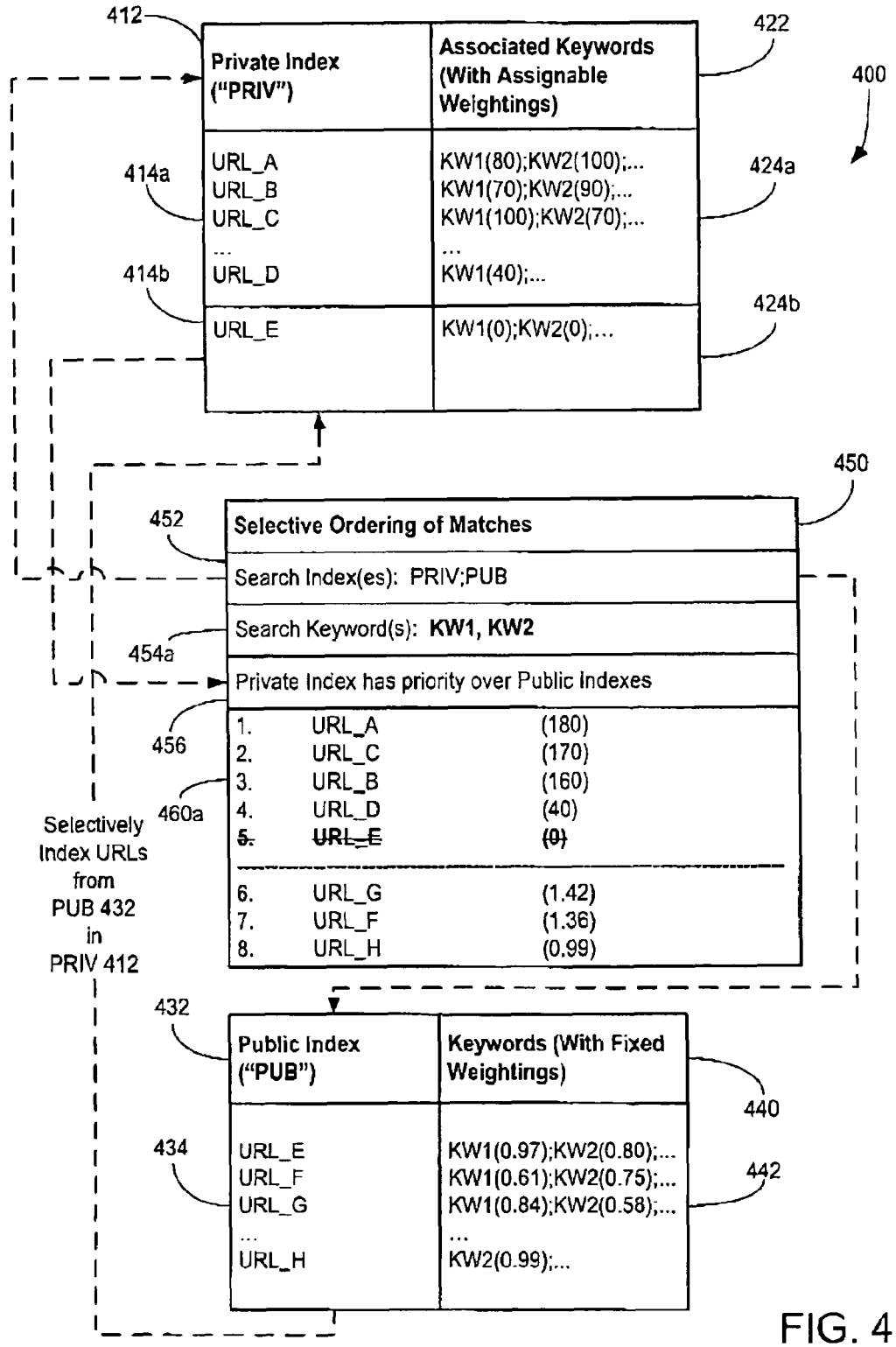
FIG. 4 schematically illustrates merged search results obtained for an example query involving the private index and the public index of FIG. 2A.

FIG. 4 schematically illustrates results of an example query 400 performed at server 110. Consider, for the time being, only the private index 212 (as embodied by index 412), and the public index 213 (as embodied by index 432).

Index 412 (having the structure of private index 212) indexes URL listings in block 414a. Tables 240 and 250 are suitably populated. In FIG. 4, arbitrary example URLs in block 414a are labeled "URL_A", "URL_B", "URL_C", and "URL_D". "URL_E" shown at block 414b will be explained in further detail below. Assume, for the present example, that each of these URLs relate to a golf web site.

For each URL in block 414a, a list of associated keywords used to index the URL is depicted in block 424a. Each of the keywords in block 424a are assigned weights shown schematically in parentheses. The URLs in block 414a are controlled, for example, by an administrator for a web site "Client 1" (e.g. the regional golf web site). Thus, keywords and weightings at 424a may be readily modified by the administrator for web site "Client 1". For example, the administrator may use exemplary method S300A of FIG. 3 to associate the keywords and assign the keyword weightings for the various URLs "URL_A" to "URL_D".

In this illustrative example, a first keyword "KW1" with a weighting of "80" and a second keyword "KW2" with a weighting of "100" are both associated with "URL_A". As another example, the same first keyword "KW1" having a different weighting of "70" and the same second keyword "KW2" having a different weighting of "90" may both be associated with "URL_B". The weighting range of 0-100 is arbitrarily chosen for illustration.

FIG. 4 further schematically illustrates entries in a public index 432, of the form of public index 213, representing a number of indexed URLs in block 434, namely, "URL_E" to "URL_H". For each URL in block 434, there is one or more associated keywords, with weightings shown in parentheses, as shown at block 442.

Example public index 432 may be generated automatically by software that follows linked web pages in order to generate an index. For each web page, the software identifies a list of significant associated keywords. In addition to automatically generating the keywords, a weighting may be assigned to each keyword associated with a given web page. For example, the weighting may be derived from how frequently a given keyword appears in the web page, or whether the keyword appears in a special area of the web page, such as the title or description. The range of fixed weightings 0.00-0.99 shown here is arbitrarily chosen for the purposes of illustration.

In any event, an administrator for web site "Client 1" has initially no effective ability to edit index entries in index 432 (i.e. "URL_E" to "URL_H" in block 434 or any of the keywords weightings shown in block 442).

However, as previously shown and described with reference to FIG. 3A, relative weightings of a given keyword associated with a given URL in private index 412 may be readily changed by the administrator for web site "Client 1". For example, for "KW1" associated with record "URL_A", the current weighting of "80" may be raised or lowered at will by assigning a new weighting. In this case, the quality of match of "URL_A", when a query includes the keyword "KW1", may be directly controlled such that a URL_A appears higher or lower in a list of resulting search results.

Advantageously, for URLs in private index 412, any keyword may be associated with a given URL, even if that keyword is not automatically generated, and even if that keyword does not appear in the subject web page. In other words, a keyword may be arbitrarily assigned to a URL for the purposes of causing that URL to appear or not appear in the search results when that keyword is used in a query. For example, if it is desirable to present "URL_D" whenever a keyword "KW9" (not shown) is entered in a query by an end-user, the keyword "KW9" is simply associated with "URL_D", and a suitable weighting may be assigned to KW9 for "URL_D" in order to ensure that "URL_D" appears whenever the keyword "KW9" is used.

Conveniently, for private index 412 an administrator may shape or organize the order of search results for any keyword simply by adjusting the relative weights of indexed URLs for that keyword. It will be appreciated, however, that if more than one keyword is used in a search query, the effect of assigning a higher or lower keyword weighting may be tempered or offset by the effect of averaging or summing the weightings of other keywords. Thus, for example, it may not be possible to ensure a high ranking unless all keywords assigned to a URL are given a relatively high weighting.

In order to include URLs in public index 432 in any shaped search, as shown in FIG. 4, one or more of the URLs in public index 432 may be selectively indexed by an administrator in private index 412. Specifically, in this illustrative example, "URL_E" has been indexed in private index 412. Consider, for example, a situation where the regional golf web site wishes to exclude "URL_E" from the search results, as it is a URL for a direct competitor of the web site, or of an advertiser.

As will be apparent, the indexing of "URL_E" in private index 412 allows an administrator to affect presentation of "URL_E" in a search result. Thus, the level of control over "URL_E" becomes the same as that over the other URLs from the block 414a. In other words, keywords may be arbitrarily associated with "URL_E", and weightings may be arbitrarily assigned to those keywords by the administrator of the institution.

In the present example, "URL_E" has been associated with keywords "KW1" and "KW2", with each of "KW1" and "KW2" being assigned a weighting of "0" or a "null" weighting. Such a null weighting may be assigned if, for example, it is undesirable to include that record in combined search results when either of those two keywords "KW1" or "KW2" are entered.

To further illustrate this, block 450 depicts search results in response to a search for keywords "KW1" and "KW2" combining URLs obtained from both private index 412 and public index 432 (as indicated at block 452). Here, the keywords "KW1" and "KW2" have been entered by an end-user in a search query, as indicated at block 454a. As indicated at 456, results for any URLs in public index 432 matching keywords "KW1" or "KW2" may be pre-empted by corresponding URLs in private index 412 (e.g. index results corresponding to "URL_E" in block 434 of public database 432 may be pre-empted by corresponding index entry "URL_E" in block 414b of private index 412). "URL_E" with a "null" weighting for each of "KW1" and "KW2" is shown in strikeout in block 460a.

Thus, as illustrated in the ordered list at 460a, a list of URLs from private index 412 matching "KW1" and "KW2" are ordered based on a sum of keyword weightings. A list of URLs from public index 432 matching "KW1" or "KW2" then follows, again in order of summed keyword weightings.

In this illustrative example, URLs from private index 412 are presented in advance of URLs from public index 432. This reflects a desire to give priority to index entries located in the private index 432 (i.e. corresponding to index 212) ahead of index entries found in the public index 434 (i.e. corresponding to index 212).

Given the ordering of URLs from private index 412 and public index 432 as described above, relevant fields from corresponding records may be presented to the end-user, in the same order. For example, the URL field 234b (FIG. 2D) and other relevant fields may be presented to the end-user. However, in this illustrative example, even though "URL_E" is in the ordered list, as "KW1" and "KW2" for "URL_E" have both been given a "null" weighting, "URL_E" is not displayed to the end-user.

Thus, an undesirable URL obtained from the public index 432 may be effectively excluded from the combined list of search results presented to the end-user. For example, a predetermined value for a quality of match calculated from summing the weight of keywords matching a search request may cause a corresponding record to be dealt with in a particular manner. For example, a null weighting for the summed weight of keywords may be used to indicate that the associated URL (URL_E in the present example) should be excluded from presentation to the end-user. Alternatively, if it is desired to promote a particular URL for more prominent display (e.g. "URL_E") from public index 432, the administrator can also assign a suitably high weighting to keywords associated with "URL_E" so that "URL_E" is prominently displayed in the combined search results.

As will be appreciated, the pre-emption or discarding of an index entry from public index 434 is triggered by a common value in a key field in both the private index 412 and the public index 432. In the disclosed embodiment, the key field is linked to a URL field 234b (FIG. 3B) via a linking mechanism typically found in a relational database, such as by the HASH_URL fields 232e/234a of each of table 240 and table 250, as shown in the present illustration (FIGS. 2C and 2D). The pre-emption or discarding is then triggered when the identical URL is retrieved from both public index 432 and private index 434. Of course, it will be appreciated that another suitable field may be used.

Given the above illustrative example in FIG. 4 of combining search results obtained from two indexes, namely private index 212/412 and public index 213/432, consider now an example in which there is a third index, such as the advertisers' index 211 of FIG. 2A. For the purposes of this illustrative example, consider a merging policy for the merging algorithm 225 (FIG. 2A) which gives advertisers' index 211 a higher relative priority than private index 212/412, and in turn gives private index 212/412 a higher relative priority to public index 213/432.

Also, as an illustrative example, consider four advertisements identified as contract item ID "CID1", contract item ID "CID2", contract item ID "CID2", and contract item ID "CID4" These contract item ID's are defined as records 270a-270d in contract item table 270 (FIG. 2F). Assume, for the purposes of the present example, that "web place" table 268 of FIG. 2E and "URL table" 234 of FIG. 2B in fact use the same "hash URL" value to refer to a web page URL. In this case, CID1 may be associated by hash URL 262j and table 268 with a web site URL_A. Similarly, CID2 is associated by hash URL 262j and table 268 with a web site URL_B. Also, CID3 is associated by hash URL 262j and database table 268 with a web site URL_C. Finally, CID4 may be associated by hash URL 262j to a web site URL_J, for example.

Also, as shown in the rank 262b field of database table 270, CID1 specifies placement in "rank 1", and CID4 specifies placement in "rank 4". However, the rank 262b field is not defined for CID2 and CID3. Instead, CID2 and CID3 are assigned to a share group "A" in share group 262i. All of CID1, CID2 and CID3 have the same start date 262d, end date 262e, and hashed key phrase 262m (with an illustrative key phrase hash value "34"). By cross-reference to record 280c of key phrase database table 280, it is shown that the key phrase hash value "34" corresponds to key phrase "KW1 KW2".

Given the above illustrative information for CID1, CID2, CID3 and CID4, and the example previously shown in FIG. 4, the advertisers search algorithm 221 may use the key phrase "KW1 KW2" to find a matching record in advertisers' index 211. Thus, in this illustrative example, CID1, CID2, CID3 and CID4 are all matched to the key phrase "KW1 KW2" by its hashed value "34", and by their respective date ranges, which includes the "current" date of an end-user query.

Given the present assumption about the merging policy for merging algorithm 225, any search result from index 211 will preempt any identical search results matched in private index 212 (as embodied in index 412 in FIG. 4) or public index 213 (as embodied in index 432 in FIG. 4). As in the case of pre-emption or discarding of an index entry from the public index 434, pre-emption of an index entry from the private index 412 or public index 434 by a result from the advertisers' index 411 may be triggered by a common value in a key field in the private index 412, the public index 432, and the advertisers' index 211. For example, the hash URL 262j of FIG. 2F for each matching index entry from the advertisers' index 211 may be compared against the hash URL 232e of FIG. 2C from the private index 212/412 and the public index 213/432.

Figure 5:
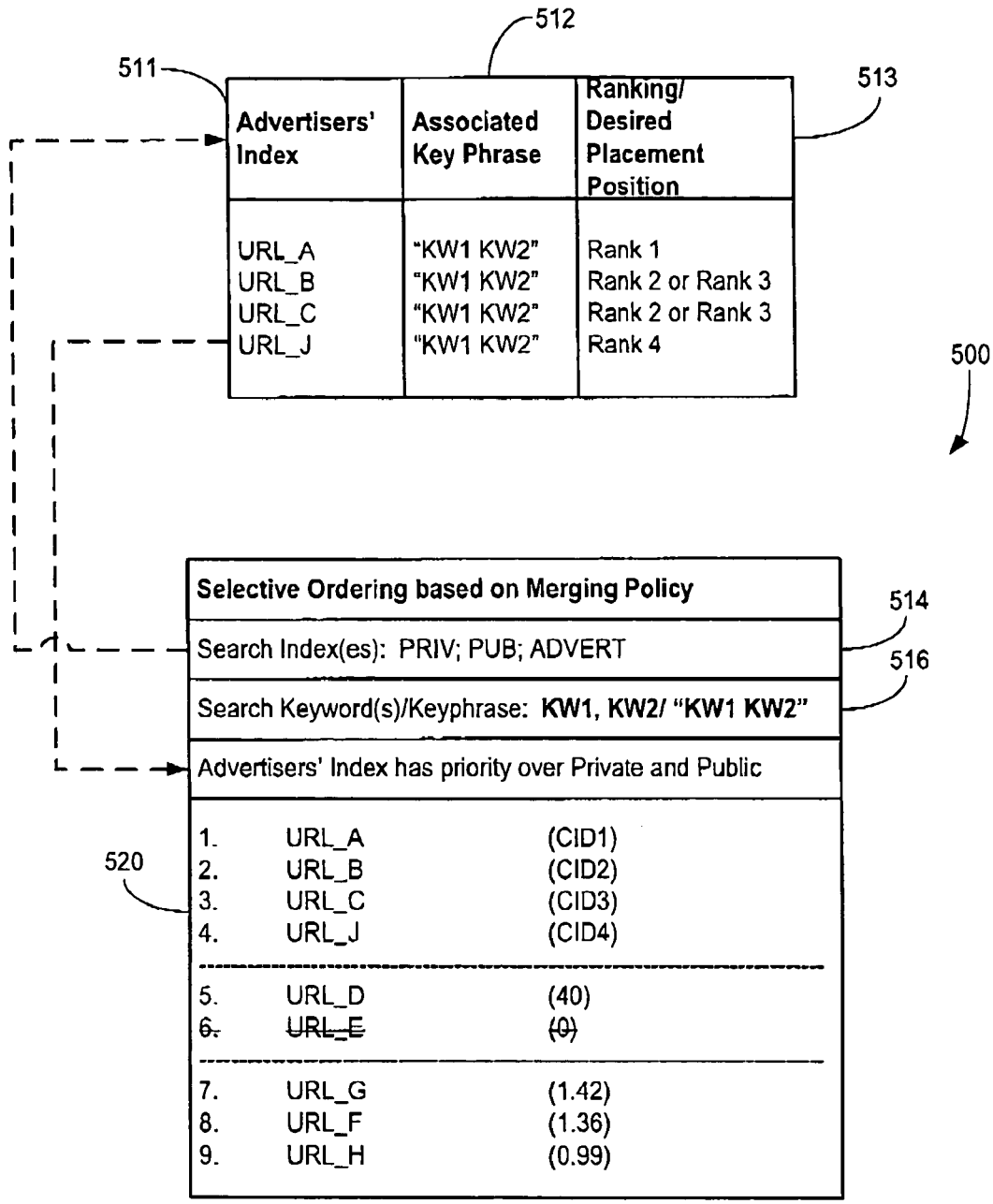
FIG. 5 schematically illustrates merged search results obtained when the example query of FIG. 4 further includes search results obtained from the advertisers' index of FIG. 2A.

FIG. 5 schematically illustrates an example of search results obtained for the example query of FIG. 4 when further including search results obtained from the advertisers' index 511 (corresponding to advertisers' index 211 of FIG. 2A). To avoid clutter, the private index 412 and public index 432 of FIG. 4 are not shown again in FIG. 5. However, it will be understood that each of the advertisers' index 511, private index 412 and public index 432 may be searched using index-specific search algorithms, as previously described.

As shown in FIG. 5, assuming that the "current" date falls in the range defined in columns 262d and 262e of FIG. 2F for the respective contract items CID1, CID2, C1D3 and CID4, and using an end user specified key phrase shown at block 516 to match a key phrase 512 (corresponding to hashed phrase 262m of FIG. 2F), the merged, ordered list of search results in block 520 is obtained.

More specifically, using the illustrative values defined above in table 270 and a desired placement position 513, for a particular day falling in the range of dates specified by the start date 262d and end date 262e, URL_A is placed in rank 1, in accordance with its assigned rank. Similarly, URL_J is placed in rank 4, in accordance with its assigned rank. In this respect, while the relative weighting of keywords KW1 and KW2 are significant for the purposes of index 212, and 213, they are irrelevant for the purposes of index 211. Rather, the assigned ranking at column 262b of FIG. 2F, if present, is determinative of the rank in which the URL will be placed, given the matching key phrase and date range.

For share group "A", a range of ranks is set out in table 290 by highest rank 266c and lowest rank 266b (2 and 3, respectively, in this illustrative example.) A key phrase hash value 266d is also associated with share group A ("34" in this example). Based on membership in share group A, URL_B and URL_C are both placed into a rank in the range defined for share group A. In an embodiment of the present invention, URL_B and URL_C may be placed in the range in a random manner. Thus, a particular rank within a range of ranks may not be guaranteed. However, in another embodiment, it will be appreciated that URL_B and URL_C may be ranked within the range defined by a share group based on some other subcriteria (not shown).

After ranks 1-4, the search results obtained from the private index 212/412 follow, ordered in the manner previously described with reference to FIG. 4 (i.e. by a summed weighting of the keywords). Note that URL_E may be deleted or suppressed by assignment of a zero weighting to its key words, as previously described with reference to FIG. 4. This may be particularly useful, for example, if URL_E is a competitor of URL_A, URL_B, URL_C or URL_J, and the advertiser does not wish have the competitor's URL appearing in the list of search results. Finally, the remaining search results from the public index 213/432 follow the search results from the private index 212/412, in the manner as previously described with respect to FIG. 4.

However, it will be observed that since all of URL_A, URL_B and URL_C are now placed in ranks 1-3 as advertisements specified by matching search results from the advertisers' index 211, corresponding search results from the private index 213/432 as previously illustrated in FIG. 4 have been pre-empted (i.e. URL_A, URL_B, and URL_C are not duplicated in block 520). URL_J, displayed in rank 4, does not have corresponding search results from the private index 213/432 so does not pre-empt another search result. Of course, if another key phrase is used, an entirely different set of advertisements may be placed in the ranks 1-4, and this may further affect the preemption or deletion of other search results obtained from the private index 212/412 and the public index 213/432.

As will be appreciated, in the example of the regional golf web site described above, the administrator will have great flexibility in querying and presenting the search results obtained from the plurality of indexes 211, 212, 213, using index-specific search algorithms. Results from these index-specific search algorithms may then be merged according to a flexible merging policy in a merging algorithm. The merging policy may, for example, prioritize the indexes and pre-empt an index entry from a lower priority index with an index entry from a higher priority index, based on matching entries in an associated key field. Thus, for example, advertisers at the regional golf web site may be guaranteed a specific position in the rankings in the search results, and URLs from competing web sites may be effectively pre-empted.

More generally, the above illustrative examples disclose a method of presenting search results in a response to an end-user query. As illustrated, the search results are combined from results from a plurality of indexes, each of the search results having an associated key field. The method comprises querying index entries of each of the plurality of indexes using an index-specific search algorithm to obtain a set of matching search results for each index, each matching search result having a quality of match specific to its index. The method further comprises determining a relative priority to each of the plurality of indexes and combining the matching search results from the plurality of indexes into a merged list of ordered search results based on the relative priority of each of the plurality of indexes. As illustrated, any search result from a lower priority index for which an associated key field is identical to the associated key field of a matching search result in a higher priority index is discarded, in favor of the matching search result from the higher priority index.

As also illustrated, the method may further comprise determining at least one keyword assigned to each index entry of at least one of the plurality of indexes, and matching at least one keyword to the end-user query to obtain the matching search results. The method may further comprise determining a weight associated with each keyword, and calculating the quality of match by summing the weights for any keywords matching the end-user query.

As further illustrated, the method may further comprise determining a key phrase assigned to each index entry of at least one of the indexes, and matching the key phrase to an end-user query to obtain the matching search result. The method may further comprise determining whether a current time for the end-user query falls within a valid time range assigned to each index entry to obtain a matching search result.

It will be understood that the illustrative hardware architecture, software, and data components discussed above may be suitably adapted to practice the illustrated method.

Embodiments of the invention could similarly include more than three indexes, each assigned a relative priority. In the event index entries sharing a like key field are retrieved in response to a search, results from the lower priority indexes are preempted by results from any higher priority index. Thus, only the matching result from the highest priority index would be included in any list of presented results. Advantageously, each index may be searched by an index-specific search algorithm (such as algorithms 211, 222 or 223) associated with only that index. As indexes are added, modular search algorithms may be added to search engine 214.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of presenting search results in a response to an end-user query, said search results being combined from results from a plurality of indexes stored at least one computing device, each of said search results having an associated key field, said method comprising:
   (i) querying index entries of each of said plurality of indexes using an index-specific search algorithm to obtain a set of matching search results for each index, each matching search result having a quality of match specific to its index;
   (ii) for each of said plurality of indexes, retrieving a stored relative priority value assigned by an administrator to each of said plurality of indexes, wherein each said stored relative priority value is applicable to all search results obtained from a particular one of said plurality of indexes;
   (iii) combining said matching search results from said plurality of indexes into a merged list of ordered search results including search results from each of said plurality of indexes based on said quality of match of each matching search result, and based on said stored relative priority value of each of said plurality of indexes as assigned by said administrator, in which any search result from an index having a lower stored relative priority value for which an associated key field is identical to the associated key field of a matching search result in an index having a higher stored relative priority value is discarded, in favor of said matching search result from said index having a higher stored relative priority value.

2. The method of claim 1, further comprising identifying at least one keyword assigned to each index entry of a first index of said plurality of indexes, and matching said at least one keyword to said end-user query to obtain said set of matching search results for said first index.

3. The method of claim 2, further comprising identifying a weight associated with each said at least one keyword, and calculating said quality of match by summing said weights for any said keywords matching said end-user query.

4. The method of claim 1, further comprising identifying a key phrase assigned to each index entry of a first index of said plurality of indexes, and matching said key phrase to said end-user query to obtain said set of matching search results for said first index.

5. The method of claim 4, further comprising determining whether a current time for said end-user query falls within a valid time range assigned to each said index entry of said first index to obtain said set of matching search results for said first index.

6. The method of claim 4, further comprising identifying a relative placement position in said merged list of ordered search results assigned to each matching search result in said set of matching search results for said first index, and placing in said relative placement position a value associated with each said matching search result from said first index.

7. The method of claim 6, wherein said value comprises a URL.

8. The method of claim 4, further comprising identifying a share group assigned to a search result in said set of matching search results from said first index, each share group having assigned thereto a range of relative placement positions in said merged list of ordered search results, and placing a value associated with said matching search result from said first index in said range of relative placement positions.

9. The method of claim 8, wherein said value comprises a URL.

10. The method of claim 8, further comprising displaying values placed in said range of relative placement positions in a contiguous order.

11. A computing device comprising a processor and computer readable memory, said memory storing
a plurality of indexes, each comprising a plurality of index entries, said index entries of said plurality of indexes each having an associated key field,
search engine software adapting said device to
(i) query index entries of each of said plurality of indexes using an index-specific search algorithm to obtain a set of matching search results for each index, each matching search result having a quality of match specific to its index;
(ii) for each of said plurality of indexes retrieving a stored relative priority value assigned by an administrator to each of said plurality of indexes, wherein each said stored relative priority value is applicable to all search results obtained from a particular one of said plurality of indexes;
(iii) combine said matching search results from said plurality of indexes into a merged list of ordered search results including search results from each of said plurality of indexes based on said quality of match of each matching search result, and based on said stored relative priority value of each of said plurality of indexes as assigned by said administrator, in which any search result from an index having a lower stored relative priority value for which an associated key field is identical to the associated key field of a matching search result in an index is discarded, in favor of said matching search result from said index having a higher stored relative priority value.

12. The device of claim 11, wherein said search engine software further adapts said computing device to identify at least one keyword assigned to each index entry of a first index of said plurality of indexes, and match said at least one keyword to said end-user query to obtain said set of matching search results for said first index.

13. The device of claim 12, wherein said search engine software further adapts said computing device to identify a weight associated with each said at least one keyword, and calculating said quality of match by summing said weights for any said keywords matching said end-user query.

14. The device of claim 11, wherein said search engine software further adapts said computing device to identify a key phrase assigned to each index entry of a first index of said plurality of indexes, and match said key phrase to said end-user query to obtain said set of matching search results for said first index.

15. The device of claim 14, wherein said search engine software further adapts said computing device to determine whether a current time for said end-user query falls within a valid time range assigned to each said index entry of said first index to obtain said set of matching search results for said first index.

16. The device of claim 14, wherein said search engine software further adapts said computing device to identify a relative placement position in said merged list of ordered search results assigned to each matching search result in said set of matching search results for said first index, and place in said relative placement position a value associated with each said matching search result from said first index.

17. The device of claim 16, wherein said value comprises a URL.

18. The device of claim 14, wherein said search engine software further adapts said computing device to identify a share group assigned to a search result in said set of matching search results from said first index, each share group having assigned thereto a range of relative placement positions in said merged list of ordered search results, and place a value associated with said matching search result from said first index in said range of relative placement positions.

19. The device of claim 18, wherein said value comprises a URL.

20. The device of claim 18, wherein said search engine software further adapts said computing device to display values placed in said range of relative placement positions in a contiguous order.

21. A computer readable medium, storing computer executable instructions that when loaded at a computing device comprising a processor and processor readable memory storing a plurality of indexes, each of said indexes comprising a plurality of index entries having an associated key field, adapt said computing device to:
(i) query index entries of each of said plurality of indexes using an index-specific search algorithm to obtain a set of matching search results for each index, each matching search result having a quality of match specific to its index;
(ii) for each of said plurality of indexes, retrieving a stored relative priority value assigned to each of said plurality of indexes by an administrator, wherein each said stored relative priority value is applicable to all search results obtained from a particular one of said plurality of indexes;
(iii) combine said matching search results from said plurality of indexes into a merged list of ordered search results including search results from each of said plurality of indexes based on said quality of match of each matching search result, and based on said stored relative priority value of each of said plurality of indexes as assigned by said administrator, in which any search result from an index having a lower stored relative priority value for which an associated key field is identical to the associated key field of a matching search result in an index is discarded, in favor of said matching search result from said index having a higher stored relative priority value.

22. The computer readable medium of claim 21, wherein said computer executable instructions further adapt said computing device to identify at least one keyword assigned to each index entry of a first index of said plurality of indexes, and match said at least one keyword to said end-user query to obtain said set of matching search results for said first index.

23. The computer readable medium of claim 22, wherein said computer executable instructions further adapt said computing device to identify a weight associated with each said at least one keyword, and calculate said quality of match by summing said weights for any said keywords matching said end-user query.

24. The computer readable medium of claim 21, wherein said computer executable instructions further adapt said computing device to identify a key phrase assigned to each index entry of a first index of said plurality of indexes, and match said key phrase to said end-user query to obtain said set of matching search results for said first index.

25. The computer readable medium of claim 24, wherein said computer executable instructions further adapt said computing device to determine whether a current time for said end-user query falls within a valid time range assigned to each said index entry of said first index to obtain said set of matching search results for said first index.

26. The computer readable medium of claim 24, wherein said computer executable instructions further adapt said computing device to identify a relative placement position in said merged list of ordered search results assigned to each matching search result in said set of matching search results for said first index, and place in said relative placement position a value associated with each said matching search result from said first index.

27. The computer readable medium of claim 26, wherein said value comprises a URL.

28. The computer readable medium of claim 24, wherein said computer executable instructions further adapt said computing device to identify a share group assigned to a search result in said set of matching search results from said first index, each share group having assigned thereto a range of relative placement positions in said merged list of ordered search results, and place a value associated with said matching search result from said first index in said range of relative placement positions.

29. The computer readable medium of claim 28, wherein said value comprises a URL.

30. The computer readable medium of claim 28, wherein said computer executable instructions further adapt said computing device to display values placed in said range of relative placement positions in a contiguous order.

* * * * *

UNITED STATES PATENT AND TRADEMARK OFFICE
CERTIFICATE OF CORRECTION

| | | |
|---|---|---|
| PATENT NO. | : 7,603,342 B2 | Page 1 of 1 |
| APPLICATION NO. | : 10/778390 | |
| DATED | : October 13, 2009 | |
| INVENTOR(S) | : David B. Gosse et al. | |

It is certified that error appears in the above-identified patent and that said Letters Patent is hereby corrected as shown below:

Column 18,
Line 39, "indexes stored at least one" should be changed to --indexes stored at at least one--.

Signed and Sealed this
Eighteenth Day of January, 2011

David J. Kappos
*Director of the United States Patent and Trademark Office*